United States Patent [19]

Mino et al.

[11] Patent Number: 5,270,080
[45] Date of Patent: Dec. 14, 1993

[54] METHOD OF MANUFACTURING CHEMICALLY ADSORBED FILM

[75] Inventors: Norihisa Mino, Settu; Kazufumi Ogawa, Hirakata, both of Japan

[73] Assignee: Matsushita Electric Industrial Co., Ltd., Osaka, Japan

[21] Appl. No.: 831,051

[22] Filed: Feb. 4, 1992

[30] Foreign Application Priority Data

Feb. 6, 1991 [JP] Japan .................... 3-038131

[51] Int. Cl.$^5$ .................... B05D 1/18; B05D 5/00; B05D 3/04
[52] U.S. Cl. .................... 427/430.1; 427/435; 427/443.1; 427/344; 427/399; 427/400; 427/337
[58] Field of Search .................... 427/430.1, 435, 443.1, 427/344, 399, 400, 337

[56] References Cited

U.S. PATENT DOCUMENTS

| 4,539,061 | 9/1985 | Sagiv | 156/278 |
| 4,863,794 | 9/1989 | Fujii | 428/325 |

FOREIGN PATENT DOCUMENTS 0363924 10/1989 European Pat. Off. .
0351092 1/1990 European Pat. Off. .
0386784 3/1990 European Pat. Off. .

OTHER PUBLICATIONS

World Patents Index Latest, Derwent Publications Ltd., London, GB; AN 86-065417 & JP-A-61 016 910 (Hitachi Cable KK), Jan. 24, 1986 (abstract), pages unavailable.

*Primary Examiner*—Anthony McFarlane
*Assistant Examiner*—Nhat D. Phan
*Attorney, Agent, or Firm*—Fish & Richardson

[57] ABSTRACT

The invention concerns a method of manufacturing an organic coating film for forming a transparent superthin film on the surface of glass, plastics, metals, etc.

Using a surface active material containing a halosilane or alkoxysilane group, an organic coating film is formed on the substrate with the surface active material chemically bonded to the substrate surface in a dry reaction atmosphere. A transparent organic coating film is thus formed with a uniform thickness at the namometer level.

A dehydrochlorination reaction is brought about on the surface of glass, plastics, metals, etc. using, for example, a chlorosilane- or chlorotitanium-based surface active material in a dry nitrogen or like atmosphere (with a relative humidity of, for example, 35% or below), followed by removal of excess surface active material, thus forming an organic coating film consisting of a monomolecular layer. This monomolecular layer is chemically bonded directly to the substrate and has high peel-off strength.

12 Claims, 1 Drawing Sheet

METHOD OF MANUFACTURING CHEMICALLY ADSORBED FILM

FIELD OF THE PRESENT INVENTION

This invention relates to a method of manufacturing a chemically adsorbed film. More particularly, the invention relates to a method of efficiently forming a chemically adsorbed monomolecular and/or polymer film as a surface film. The method can be used in the fields of glass, metal, ceramic, plastic, semiconductor, etc., manufacturing.

BACKGROUND OF THE INVENTION

In the fields of glass, metal, ceramic, plastic, semiconductor, etc. manufacturing, water-repelling, oil-repelling, anti-fogging, anti-contaminating, durability and various other properties are imparted to manufactured substrates by applying a coating film on the substrate surface. By imparting these properties, the value of the manufactured products can be enhanced.

Among well-known methods of providing a coating film on the substrate surface are dipping, spraying, brushing, spin coating, and printing techniques such as the planographic process, relief printing and screen printing. In these techniques, however, the coating solution is merely put physically on the substrate surface, and the adhesion between the substrate surface and coating film is not sufficiently high. A coating film should have a specific thickness. However, it has been difficult using known method to form a coating film having a thickness at the nanometer level which is uniform and free from pin holes.

Treating the surface of a glass or like substrate with a silane-based surface active material is well known in the art and practiced, for example, when producing a glass fiber-reinforced resin with improved adhesion between the glass fiber and resin.

In a first prior art method, silane-based surface active materials containing a monomethoxysilane, dimethyxysilane or trimethoxysilane group, are used for film formation. Prior to film formation, these surface active materials are subjected to hydrolysis to produce highly reactive silanol groups and also form oligomers which comprise siloxane bonds. A coating is formed by dipping a substrate, on which a film is to be formed, in a solution containing the silane-based surface active material. In another method, it is formed by a turn coating process, in which the solution noted above dropped onto the substrate while the substrate is rotated, the number of rotations being appropriately preset according to a desired thickness. In a further method, the solution is sprayed onto the substrate surface for film formation. Any of the above processes permits formation of a coating film of a silane-based surface active material although the uniformity of the film varies. After film formation, the substrate is baked. The temperature and time of baking, are respectively 100° C. and one hour, as standards. In this process, a methanol removal reaction is caused between methoxy groups of the silane-based surface active material and hydroxyl groups exposed at the substrate surface or by each other methoxy groups of the silane-based surface active material. Thus, chemical bonds are produced between the substrate and silane-based surface active material and also by the silane-based surface active material itself, thus obtaining an organic coating film.

In a second prior art example using a silane-based surface active material, or a silane-based surface active material containing a monochlorosilane, dichlorosilane or trichlorosilane group is used. A coating film is formed on the substrate surface by coating such a surface active material in the same manner as in the first prior art example. Where such surface active material are used, chemical bonds between the substrate and silane-based surface active material or by the silane-based surface active material itself, can be obtained. An organic coating film can be formed without any sintering treatment as in the first prior art example.

Surface active materials comprising chlorotitanium groups may further be used in a manner as in the second prior art example using a silane-based surface active material.

With the dipping process, turn coating process and spraying process in the above first prior art example, however, the substrate and silane-based surface active material are bonded to each other by hydrogen bonds, and the film thickness before sintering is not uniform. In addition, the substrate and silane-based surface active material form covalent bonds, and the silane-based surface active material itself forms covalent bonds. It is thus difficult to form a uniform film on the substrate surface.

In the second prior art example film formation process, the silane-based surface active materials comprise chlorosilane groups, which are highly reactive and can react with moisture in the air to form silanol groups and also form an oligomer containing siloxane bonds. When such a solution is coated by a dipping or like process to form the film, a film is obtained like those in the first prior art example. Further, if a hydrogen chloride removal reaction could be caused between hydroxyl groups at the substrate surface and the chlorosilane groups to form a film by the dripping or like process prior to a reaction between moisture in the air and the chclorosilane groups, a condensation reaction between the silane-based surface active molecules themselves form without any covalent bonds being formed with the substrate, thereby forming a polymer comprising siloxane bonds. The polymer makes the film surface rough and also makes the film thickness non-uniform. Further, a film required to be transparent is made opaque with the formation of the polymer. These problems are also raised with the surface active materials containing a chlorotitanium group.

The present invention seeks to solve the above problems inherent in the prior art, and its object is to provide a method of forming a transparent organic coating film, which has a uniform thickness at the nanometer level.

SUMMARY OF THE INVENTION

The primary objective of this invention is to provide a method of forming a chemically adsorbed monomolecular film on the surface of a substrate, wherein the surface contains active hydrogen groups, the method comprising:
(A) preparing a chemical adsorbing material solution by dissolving a chemical adsorbing material in a nonaqueous organic solvent, the chemical adsorbing material having one end functional molecular groups capable of reacting with the active hydrogen groups on the substrate surface;
(B) dipping the substrate in said chemical adsorbing material solution in a dry atmosphere, thereby causing adsorption of the chemical adsorbing material to the substrate surface; and (C) washing non-reacted chemical adsorbing material away from the substrate surface using a non-aqueous organic solution.

It is preferable in this invention that a dry atmosphere is maintained during the step of washing away the non-reacted chemically adsorbing material.

Another objective of this invention is to provide a method of forming a chemically adsorbed polymer film on the surface of a substrate, wherein the surface of the substrate contains active hydrogen groups, the method comprising:

(a) preparing a chemical adsorbing material solution by dissolving a chemical adsorbing material in a non-aqueous organic solvent, the chemical adsorbing material having one end functional molecular groups capable of reacting with the active hydrogen groups on the substrate surface;

(b) dipping the substrate in said chemical adsorbing material solution in a dry atmosphere, thereby causing adsorption of the chemical adsorbing material to the substrate surface;

(c) forming on the substrate an adsorbed precursor film containing a silanol group by reacting the chlorosilane groups with water after the dipping step; and (d) drying the adsorbed precursor film.

It is preferable in this invention that the relative humidity of the dry atmosphere for the reaction is 35% or below as measured by a hygrometer.

It is preferable in this invention that the molecular ends of the chemical adsorbing material comprise at least one member selected from the group consisting of a halogenated silyl (—SiX) group, a halogenated titanyl (—TiX) group, a halogenated stannyl (—SnX) group, a lower-alkoxysilyl (—SiOR) group, a lower-alkoxytitanyl (—TiOR) group and a lower-alkoxystannyl (—SnOR) group, where X represents chlorine, bromine, fluorine or iodine and R represents a $C_1-C_6$ alkyl group.

It is preferable in this invention that the chemical adsorbing material comprises one end functional chlorosilyl (—SiCl) group and a fluorine group.

It is preferable in this invention that the concentration of the chemical adsorbing material in the non-aqueous organic solvent is in a range of $10^{-4}$ to $10^{-1}$ mol/l.

It is preferable in this invention that the substrate comprises material selected from the group consisting of glass, metal, ceramic, plastic and semiconductor etc.

It is preferable in this invention that the substrate is an oxidation treated plastic substrate.

In the method according to the invention, a reaction is carried out in a dry atmosphere. Thus, it is possible to suppress the condensation reaction of a silane- or titanium-based surface active material containing at least a halogen or alkoxyl group and permits chemical bonding to occur between the substrate surface and the surface active material.

As a result, a transparent organic coating film can be obtained, which has a uniform thickness at the nanometer level. This thin film can be considered to be a monomolecular film. The reaction noted above is brought about between —OH groups at the substrate surface and —SiCl groups in a chlorosilane-based surface active material as the surface active material noted above, thus producing —SiO— bonds. The monomolecular film is chemically bonded by siloxane bonds to the substrate surface.

In a further preferred embodiment of the invention, the relative humidity as a measure of the dry condition of the atmosphere for the reaction is 35% or below as measured by a hygrometer. In this case, chlorine atoms in the chlorosilyl or chlorotitanium groups undergo a dehydrochlorination reaction with hydroxyl groups at the substrate surface to form covalent bonds. The molecules of the surface active material do not substantially undergo any condensation reaction with one another because of a reduced atmospheric moisture content and because they react only with the substrate surface. Thus, an organic coating film having a uniform thickness can be formed.

According to the invention, it is possible to use any silane- or titanium-based surface active material containing at least a halogen or alkoxyl group. Examples of the material are those based on chlorosilane, bromosilane, iodosilane, alkoxysilane (e.g., methoxysilane, ethoxysilane and propoxysilane), chlorotitanium, bromotitanium, iodotitanium, and alkoxytitanium (methoxytitanium, ethoxytitanium and propxytitanium). In view of the case of handling and the reactivity, it is preferable to use at least one surface active material selected from a group consisting of chlorosilane-, chlorotitanium- and alkoxysilane-based surface active materials.

In a further preferred embodiment of the invention, as the chlorosilane-based surface active material at least one compound selected from a group consisting of monochlorosilane, dichlorosilane and trichlorosilane compounds may be used or, alternatively, as the chlorotitanium-based surface active material at least one compound selected from a group consisting of monochlorotitanium, dichlorotitanium and trichlorotitanium compounds may be used. As an object of the invention, a monomolecular film may be obtained by appropriately selecting these surface active materials.

In a further preferred embodiment of the invention, a process of forming an organic coating film in a dry atmosphere comprises at least a step of forming an organic coating film on a substrate and a step of removing surface active material which is not bonded to the substrate with the organic coating film formed thereon. In this case, if surface active material without being bonded to a substrate is present on the surface of an organic coating film formed on the substrate, it may be removed by dipping (or washing) the system in a solution in which it is soluble. The relative humidity is held low, and it is possible to prevent a polymer from being formed by a condensation reaction of molecules at the surface of the substrate. In this process, an organic coating film having a uniform thickness at a nanometer level can be formed.

As shown above, according to the invention, a super-thin film capable of nanometer level thickness control, can be formed by controlling the relative humidity of the atmosphere in the organic coating film formation process. In addition, the invention permits transparency unseen in the prior art to be realized for substrate surface coatings required to be transparent.

DETAILED DESCRIPTION OF THE INVENTION

Figure 1:
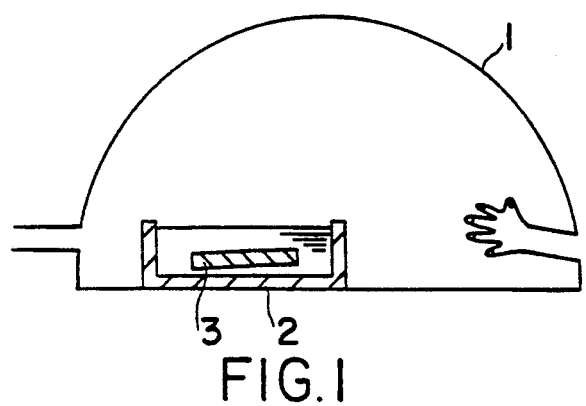
FIG. 1 is a schematic view showing an adsorption step in one embodiment of the invention.

The invention concerns a method of manufacturing an organic coating film for forming a transparent super-thin film on the surface of glass, plastics, metals, etc.

Using a surface active material containing a halosilane or alkoxysilane group, an organic coating film is formed on the substrate with the surface active material chemically bonded to the substrate surface in a dry reaction atmosphere. A transparent organic coating film is thus formed with a uniform thickness at about a namometer level.

A dehydrochlorination reaction is brought about on the surface of glass, plastics, metals, etc. using, for example, a chlorosilane- or chlorotitanium-based surface active material in a dry nitrogen or like atmosphere (with a relative humidity of, for example, 35% or below), followed by removal of excess surface active material, thus forming an organic coating film consisting of a monomolecular layer. This monomolecular layer is directly chemically bonded to the substrate and thus has high peel-off strength.

The substrate according to the invention is by no means limited so long as its surface contains active hydrogen groups such as —OH, —COOH, —NH$_2$ or =NH groups. Examples of the substrate material are various kinds of glass such as quartz glass, fluoride glass and metalized glass, metals such as aluminum, iron, stainless steel, titanium, semiconductors such as silicon and germanium, and plastics such as polypropylene, polystyrene, polyethylene and acryl resin. Substrates with less surface hydrophilic groups, for example plastic substrates, may be made suitable according to the invention by increasing the hydrophilic groups through ordinary chemical treatment means, e.g., an oxygen plasma treatment, a corona treatment or a method of dipping the material in a blend solution containing concentrated sulfuric acid and potassium dichromate (i.e., a chromium blend liquid treatment). Polyimide resins and polyurethane resins have surface imino groups (=NH) and therefore do not require any pre-treatment.

An alternative pre-treatment means effective for the surface of substrates such as glass, metals, ceramics, plastics, and silica (SiO$_2$), is for example deposited, or polyhalogenated silane such as dichlorosilane, trichlorosilane and tetrachlorosilane is coated, and reacted with water. The pre-treatment can be with or without washing with a non-aqueous solution and increases the formation of silanol (—SiOH) groups on the substrate surface. By so doing, the chemical adsorbing material can be reacted at a high concentration.

According to the invention, any organic solvent may be used so long as it is a non-aqueous organic solvent, does not attack the substrate and permits sufficient dissolution of the chemical adsorbing material, since the chemical adsorbing material is reacted with hydrous molecules. Examples of the organic solvent are long chain alkyl-based solvents, aromatic hydrocarbon-based solvents, aliphatic hydrocarbon-based solvents and halogen-containing solvents.

The concentration of the chemical adsorbing material solution is varied depending on the concentration of hydrophilic groups present on the substrate surface or the surface area of the substrate. If the concentration is too low, the adsorption speed is low. On the other hand, if the concentration is too high, the number of molecules preferentially chemically adsorbed onto the hydrophilic groups at the substrate surface and the adsorption speed are not effected. In addition, the already preferentially adsorbed monomolecular film is sort of dodged through by molecules that are adsorbed to non-adsorbed hydrophilic groups remaining on the substrate surface in the final stage of adsorption. Because of this dodging, the time until reaching a high concentration adsorbed state is not significantly effected. Therefore, it is preferred that the concentration of chemical adsorbing material solution is about $10^{-4}$ mol/l or above, more preferably $10^{-1}$ mol/l or above. The most preferred upper limit is $10^{-1}$ mol/l.

To form only a single chemically adsorbed monomolecular film (a non-polymer film) according to the invention, it is necessary to carry out after the monomolecular film formation step a washing step, in which non-reacted molecules remaining on the monomolecular film are washed away without water. In this washing step the washing efficiency can be significantly increased by using ultrasonic waves. As a method of washing, ultrasonic waves are applied by transferring the substrate to a washing solution, or while causing over-flow of the washing solution, or by renewing the washing solution several times.

Examples of the chemical adsorbing material to be used suitably according to the invention are such as follows:
$CF_3(CH_2)_2Si(CH_3)_2(CH_2)_{15}SiCl_3$,
$F(CF_2)_4(CH_2)_2Si(CH_3)_2(CH_2)_9SiCl_3$,
$CF_3CH_2O(CH_2)_{15}SiCl_3$,
$CF_3COO(CH_2)_{15}SiCl_3$,
$CF_3(CF_2)_9(CH_2)_2SiCl_3$,
$CF_3(CF_2)_7(CH_2)_2SiCl_3$,
$CF_3(CF_2)_5(CF_2)_2SiCl_3$,
$CF_3(CF_2)_7(CF_2)_2SiCl_3$, and
$CF_3CH_2O(CH_2)_{15}SiCl_3$ etc.

According to the invention ultrasonic waves are preferably used in the monomolecular and/or polymer film formation step. Thus, the adsorption time for the formation of the adsorbed film can be greatly reduced compared to known methods. This is effective for industrial mass production as well. Further, with the method according to the invention, the chemical adsorbing material can be adsorbed at a high concentration compared to the known chemically adsorbed films. Thus, it is possible to form a film substantially free from pin holes (substantially pin-hole free) and obtain more stabilized and improved physical and chemical properties of the film. Further, it is possible to improve the orientation of the adsorbed molecules.

The invention is applicable to various fields.

The invention can be widely applied to the following material surface. Materials made of metals, cermics or plastics, woods and stones etc. are applicable to the substrate. The surface of the substrate can also be coated with paints or the like.

Examples of cutlery: a kitchen knife, scissors, a knife, a cutter, a graner, a razor, hair clippers, a saw, a plane, a chisel, a gimlet, a badkin, a bit (cutting tools), the edge of a drill, the edge of a mixer and juicer, a blade of a mill, a blade of a lawnmower, a punch, a straw cutter, a staple of a stapler, a can opener or a surgical knife and the like.

Examples of needles: an acupuncture needle, a sewing needle, a matting needle, an injection needle, a surgical needle, a safety pin and the like.

Examples of products in the pottery industry: products made of a pottery, a glass, ceramics or enameled products. For example, such as sanitary pottery (a chamber pot, a washbowl, a bathtub etc.), tableware (a rice-bowl teacup, a dish (plate), a bowl, a teacup, a glass, a bottle, a coffee-pot (siphon), a pan, an earthenware mortar, a cup and (the like), vases (a flower bowl, a flowerpot, a bud vase and the like), water tanks (a breeding cistern, an aquarium water tank and the like), chemical experiment appliances (a beaker, a reactor vessel, a test tube, a flask, a laboratory dish, condenser, a mixing rod, stirrer, a mortar, a bat, a syringe etc.) a roof tile, enameled ware, an enameled washbowl, and an enameled pan and the like.

Examples of mirrors: a hand mirror, a full-length mirror, a bathroom mirror, a lavatory mirror, vehicle mirrors(a rear-view mirror, a side mirror, a door mirror etc.), half mirror, road mirrors such as a curve mirror, a show window glass, a salesroom in the department store, medical care mirrors, a concave mirror, a convex mirror and the like.

Examples of molding parts: dies for press molding, dies for cast molding, dies for injection molding, dies for transfer molding, dies for compression molding, dies for transfer molding, dies for inflation molding, dies for vacuum molding, dies for blow forming, dies for extrusion molding, dies for fiber spinning, a calender processing roll and the like.

Examples of ornaments: a watch, a jewel, a pearl, a sapphire, a ruby, an emerald, a garnet, a cat's eye, a diamond, a topaz, a bloodstone, an aquamarine, a turquoise, an agate, a marble, an amethyst, a cameo, an opal, a crystal, a glass, a ring, a bracelet, a brooch, a tiepin (a stickpin), an earring, a necklace, jewelry made of platinum, gold, silver, copper, aluminium, titanium, tin and those alloy, stainless steel, a glass frame and the like.

Examples of forming molds for food: cake, cookies, bread-baking, chocolate, jelly, ice cream, ovenware, ice trays and the like.

Examples of cookware: kitchen utensils (a pan and a pot), a kettle, a pot, a frying-pan, a hot plate, a toasting net, a takoyaki plate and the like.

Examples of papers: photogravure paper, hydrophobic and oilphobic paper, poster paper, high-grade pamphlet paper, wrapping paper, package paper, drinking package paper, container paper, printing paper, synthtic insulating paper and the like.

Examples of resin(s): a polyolefin such as a polypropylene and polyethylene, a polyvinylchloride plastic, a polyamide, a polyimide, a polyamideimide, a polyester, an aromatic polyester, a polycarbonate, a polystyrene, a polysulfide, a polysulfone, a polyethersulfone, a polyphenylenesulfide, a phenolic resin, a furan resin, a urea resin, an epoxy resin, a polyurethane, a silicon resin, an ABS resin, a methacrylic resin, an acrylate resin, a polyacetal, a polyphenylene oxide, a poly methylpentene, a melamine resin, an alkyd resin, an unsaturated polyester cured resin and the like.

Examples of rubber: styrene-butadiene rubber, butyl rubber, nitril rubber, chloroprene rubber, polyurethane rubber, silicon rubber and the like.

Examples of household electrical appliances: a television, a radio, a tape recorder, an audio player, a compact disc (CD), a refrigerator, a freezer, an air conditioner, a juicer, a mixer, a blade of an electric fan, a lighting apparatus, a dial plate, a dryer for perms and the like.

Examples of sports articles: skis, fishing rods, poles for pole vaulting, boats, yachts, surfboards, golf balls, bowling balls, fishing line, fishing nets, floats and the like.

The examples applying to vehicle parts:
(1) ABS resin: a lamp cover, an instrument panel, trimming parts, a protector for a motorcycle.
(2) Cellulose plastic: a car mark, a steering wheel
(3) FRP (fiber reinforced plastics): a bumper, an engine cover (jacket)
(4) Phenolic resin: a brake
(5) Polyacetal: wiper gear, a gas valve
(6) Polyamide: a radiator fan
(7) Polyarylate (polycondensation polymerization by bisphenol A and pseudo phthalic acid): a directional indicator lamp or lens, a meter panel, a relay case
(8) Polybutylene terephthlate (PBT): a rear end, a front fender
(9) Poly(amino-bismaleimide): engine parts, a gear box, a wheel, a suspension drive system
(10) Methacrylate resin: a lamp cover lens, a meter panel and its cover, center mark
(11) Polypropylene: a bumper
(12) Polyphenylene oxide: a radiator grill, a wheel cap
(13) polyurethane: a bumper, a fender, an instrument panel, a fan
(14) Unsaturated polyester resin: a body, a fuel, tank, a heater housing, a meter pannel.

Examples of office supplies: a fountain pen, a ball-point pen, a propelling pencil (an automatic or a mechanical pencil), a pencil case, a binder, a desk, a chair, a bookshelf, a rack, a telephone stand table, a rule (measure), a drawing instrument and the like.

Examples of building materials: materials for a roof, an outer wall and interiors. Roof materials such as a brick, a slate and a tin (a galvanized iron sheet) and the like. Outer wall materials such as wood (including a processed manufactured wood), mortar, concrete, ceramics sizing, a metalic sizing, a brick, a stone, plastics and a metal like aluminium. Interior materials such as a wood (indluding a processed one), a metal like aluminium, plastics, paper, fiber and the like.

Examples of building stones: granite, marble and others used for such as a building, a building material, an architectured fixture, an ornament, a bath, a grave, a monument, a gatepost, a stone wall, a paving stone and the like.

Examples of musical instruments and sound apparatus: a percussion instrument, a stringed instrument, a keyboard instrument, a woodwind instrument, brass and others, and sound apparatus such as a microphone and a speaker. To be specific, there are musical instruments such as a drum, a cymbal, a violin, a cello, a guitar, a koto (harp), a piano, a flute, a clarinet, a bamboo flute and a horn, and sound apparatus such as a microphone, a speaker and an ear-phone and the like.

Examples of a thermos bottle, a vacuum bottle, a vacuum vessel and the like.

Examples of a highly resisiting voltage insulator such as a power supplying insulator or a spark plug, which are highly hydrophobic, oilphobic and aid in preventing contamination.

The invention will now be described in greater detail in conjunction with specific examples.

EXAMPLE 1

FIG. 1 shows an apparatus for manufacturing an organic coating film of a surface active material on a substrate.

In this example, octadecyltrichlorosilane [$CH_3(CH_2)_{17}SiCl_3$] was used as the surface active material. One mmol/l of the surface active material was dissolved in a mixture solvent containing hexadecane, chloroform and carbon tetrachloride in a weight ratio of 80:12:8 to prepare an organic coating solution. The solution was placed in a sealed polytetrafluoroethylene container.

Dry nitrogen gas was introduced into a polypropylene glove bag 1 containing a gas inlet and a gloves. A hygrometer provided in the glove bag indicated that the relative humidity was about 15%. A vessel 2 for dipping a substrate, a silicon substrate (or silicon wafer) 3 and a polytetrafuloroethylene container containing the solution were placed in the glove bag 1 which was maintained in a dry condition. Then, the surface active material solution was poured into the vessel 2 in an amount sufficient to dip the silicon substrate 3 into it. The silicon substrate 3 was dipped and held in the surface active material solution for one hour. A dehydrochlorination reaction proceeded between hydroxyl groups at the silicon substrate surface and chlorosilane groups. The substrate surface was uniformly covered by an organic coating film comprising silane-based surface active material.

Subsequently, a closed container containing chloroform was placed in the glove bag 1 for washing the silicon substrate 3. Chloroform is known to be able to dissolve the surface active material, so it was used as a washing liquid. Chloroform was provided in an amount sufficient to dip the silicon substrate into it. The container containing chloroform had a shape capable of inserting the silicon substrate 3. In the glove bag 1, the closed container containing chloroform was opened to contact the chloroform with the dry atmosphere.

The silicon substrate 3 was taken out of the vessel 2 containing the surface active material and dipped in the chloroform in the closed container. This operation had to be done quickly, even in the glove bag 1, in a dry atmosphere. After the closed container containing the chloroform with the silicon substrate 3 dipped therein was sealed, it was taken out of the glove bag 1.

Figure 2:
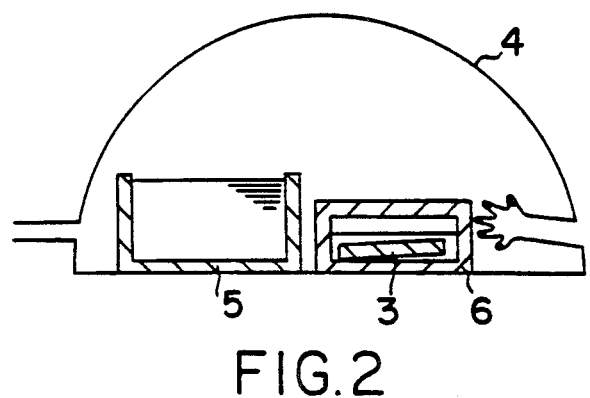
FIG. 2 is a schematic view showing an washing step in one embodiment of the invention.

FIG. 2 shows an apparatus for manufacturing an organic coating film in which the substrate (here silicon substrate) was washed after formation of the organic coating film on the substrate. A glass container 5 containing chloroform and a sealed container 6 containing chloroform with the silicon substrate 3 dipped therein, were placed in a polypropyrene glove bag 4 having a shape like that of the glove bag noted above and containing a gas inlet and gloves. Then the glass container 5 containing chloroform and sealed container 6 containing chloroform with the silicon substrate 1 dipped therein, were made to contact the dry atmosphere by opening the sealed container before taking out the silicon substrate from chloroform.

Subsequently, the silicon substrate 3 was taken out of the sealed container 6 and put into the glass container 5 containing chloroform for washing away surface active material remaining on the surface of the organic coating film of the surface active material on the silicon substrate without being chemically bonded to the same with chlorofrorm. A square substrate with a side dimension of 5 cm was washed by dipping and holding in 500 ml of chloroform for 15 minutes. After washing, the silicon substrate was taken out from the glass container 5 containing chloroform, then dried in dry nitrogen sealed in the glove bag 4, and then taken out of the glove bag.

The chlorosilyl (—SiCl) groups of the chlorosilane-based chemical adsorbing material and the hydroxy (—OH) groups present on the surface of the substrate 3, reacted by a dehydrochlorination reaction to form covalently bonds as shown by the formula 1.

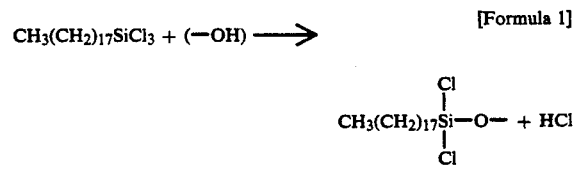

[Formula 1]

By providing water to the surface of the treated substrate or by contacting the surface with humidified air, chemical bonds were formed bonds as shown by the formula 2.

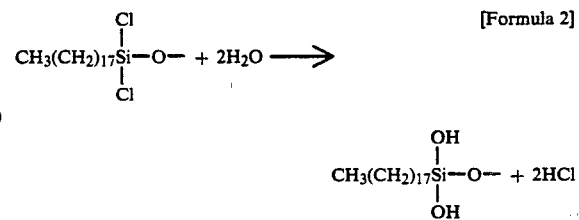

[Formula 2]

Silanol (—SiOH) groups were reacted by dehydration condensation with adjacent silanol (—SiOH) groups to form bonds as shown by the formula 3.

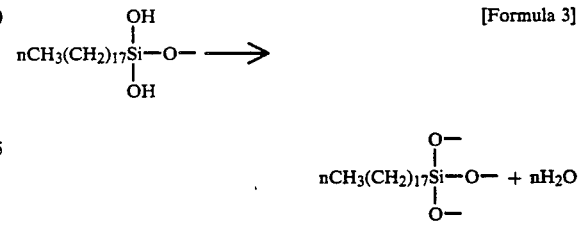

[Formula 3]

With this series of operations, an organic coating film comprising octadecylsilane-based film was formed on the silicon substrate. It had a thickness corresponding to the molecular length of the surface active material (i.e., 2.5 nm in this example). The surface of this organic coating film contained no hydroxyl groups, which could undergo a dehydrochlorination reaction with a chlorosilane group of the surface active material in the solution remaining without being chemically bonded to the substrate. Therefore, only a reaction between the substrate surface and surface active material took place, and no further film was formed on the organic coating film. Thus, the film thickness was not disturbed. The film thickness corresponded to the molecular length of the surface active material used (i.e., at the nanometer level). Thus, a super-thin organic coating film could be obtained. This thin organic coating film could not be detected on a mirror surface which had silicon substrate.

In addition, when it was formed on a glass or like transparent substrate, the transparency thereof, as measured using a transmission type visible/ultraviolet spectrograph, did not deteriorate.

COMPARATIVE EXAMPLE 1

An organic coating film was formed by the same process as in example 1 except that the relative humidity of the atmosphere was set to 55%. After pouring the surface active material solution into the vessel and dipping in the silicon substrate, the system was left. As time passed, a white film formed at the gas/liquid interface. This was due to the condensation of surface active material caused by a dehydrochlorination reaction between the moisture in the atmosphere and the chlorosilane groups of the surface active material at the gas/water interface. It is thought that a dehydrochlorination reaction also takes place between the substrate surface and the surface active material in the solution for film formation. After the lapse of a predetermined period of time (i.e., one hour in this example), the substrate was shifted into the closed container containing the chloroform for washing. When the substate was taken out of the surface active material solution, the organic coating film formed in the solution was covered by a film formed by a condensation of the surface active material formed at the gas/liquid interface of the solution. The film formed at the gas/liquid interface was white because of a lack of unformity in film thickness. Thus, the mirror surface which had a silicon substrate was fogged and whitish. This substrate was then put into the sealed container containing the chloroform. The sealed container was then put into a glove bag for washing. In this process, however, the white film adhered to the organic coating film formed on the substrate surface, and it could not be removed.

Film formation was also carried out in an atmosphere with a relative humidity exceeding 50%. In this case, not only a white film was formed, but also water was introduced into the solution due to a dehydrochlorination reaction between the surface active material and moisture content in the atmosphere at the gas/liquid interface. During film formation the surface of the dipped substrate was observed to be white. In addition, film roughness could be measured by the contact type roughness gauge (i.e., to a micrometer level).

EXAMPLE 2

Figure 3:
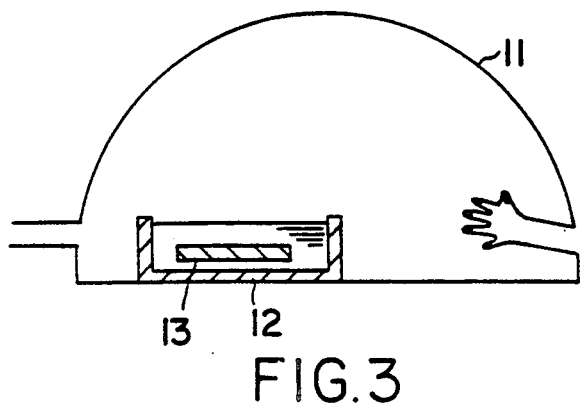
FIG. 3 is a schematic view showing an adsorption step in one embodiment of the invention.

A second embodiment of the organic coating film according to the invention will now be described in detail. FIG. 3 shows an apparatus for manufacturing an organic coating film of a surface active material on a substrate. In the example, octadecyltrichlorotitanium was used as the surface active material. A solution for organic coating was prepared by dissolving one mmol/l of the surface active material in a mixture solvent containing hexadecane manufactured by Aldrich, chloroform manufactured by Kanto Kagaku Co., Ltd. and carbon tetrachloride in a weight ratio of 80:12:8. The solution was placed in a sealed polytetrafluoroethylene container. Then, sufficient dry nitrogen gas was introduced into a polypropyrene glove bag 11 containing a gas inlet and gloves. A hydrometer placed in the glove bag 11 indicated that the relative humidity was about 20%. Then, a vessel 12 for dipping the substrate, a silicon substrate 13 and a polytetrafluoroethylene container containing the solution was placed in the glove bag 11 and was maintained in a dry condition. Then the surface active material solution was poured into the vessel in an amount sufficient to dip the silicon substrate 13 into the vessel 12. The silicon substrate 13 was dipped and held for one hour in the surface active material solution. Thus, a dehydrochlorination reaction proceeded between the hydroxyl groups at the silicon substrate surface and the chlorotitanium groups. The substrate surface was uniformly covered by an organic coating film of octadecylchlorotitanium surface active material. Subsequently, a sealed container containing chloroform for washing the silicon substrate 13 was placed in the glove bag 11. Chloroform is known to be capable of dissolving the surface active material, and thus was used as the washing liquid. The container for washing the silicon substrate was filled with chloroform to a level sufficient to dip the substrate, and it had a shape capable of inserting the substrate 13. In the glove bag 11, the closed container containing chloroform was opened and contacted with the dry atmosphere. Subsequently, the silicon substrate 11 was taken out of the vessel 12 containing the surface active material and then dipped in the chloroform contained in the sealed container. This operation had to be done quickly, even with the glove bag held in the dry atmosphere. After the sealed container containing chloroform with the silicon substrate 13 held therein was sealed, it was taken out of the glove bag 11.

Figure 4:
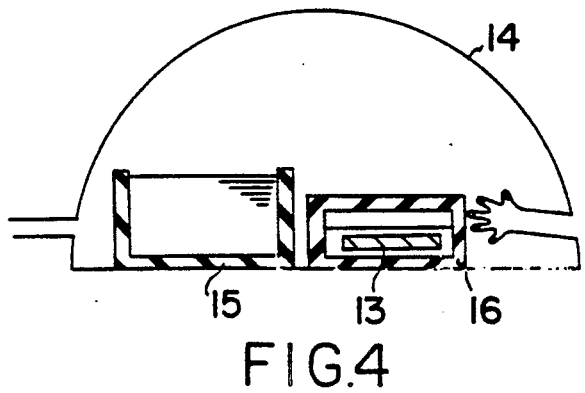
FIG. 4 is a schematic view showing an washing step in one embodiment of the invention.

FIG. 4 shows an apparatus for manufacturing an organic coating film, in which washing is carried out after formation of an organic coating film on a substrate (i.e., a silicon substrate in this case). The glass container 15 containing chloroform and the sealed container 16 containing chloroform with the silicon substrate 13 held therein, were placed in a polypropylene glove bag containing a gas inlet and gloves. The glass container 15 containing the chloroform and the sealed container 16 containing chloroform with the silicon substrate held therein, in the glove bag, were contacted with the dry atmosphere by opening the sealed container before taking the silicon substrate out of the chloroform.

Subsequently, the silicon substrate 13 was taken out of the sealed container 16, and surface active material remaining on the surface of the organic coating film of the surface active material on the silicon substrate without being chemically bonded to the substrate was washed away with the chloroform in the glass container 15. A square substrate with a side dimension of 5 cm was washed by dipping and holding in 500 ml of chloroform for 15 minutes. After the washing, the silicon substrate was taken out of the glass container 15 containing the chloroform, then dried in dry nitrogen sealed in the glove bag 14, and then taken out from the same. With the above series of operations, an organic coating film comprising octadecyltrichlorotitanium was formed on the silicon substrate. The film had a thickness corresponding to the molecular length of the surface active material (i.e., about 2.5 nm). The surface of this organic coating film contained no hydroxyl groups which could undergo a dehydrochlorination reaction with the chlorotitanium groups of the surface active material remaining in the solution without being chemically bonded to the substrate. Thus, only a reaction between the substrate surface and surface active material took place, and no further film was formed on the organic coating film. Thus, the film thickness was not disturbed.

The film thickness corresponded to the molecular length of the surface active material used (i.e., at a nanometer level), and it was possible to form a super-thin organic coating film. Thus super-thin organic coating film was could not be detected on a mirror surface which had silicon substrate. Further, it could be formed on a glass or like transparent substrate without deteriorating the transparency of the substrate.

EXAMPLE 3

In this example, octadecyltribromotitanium was used as the surface active material. One mmol/l of the surface active material was dissolved in a mixture solvent containing hexadecane, chloroform and carbon tetrachloride in a weight ratio of 80:12:8 to prepare an organic coating solution. The solution was placed in a sealed polytetrafluoroethylene container.

Dry nitrogen gas was introduced into a polypropyrene glove bag 1 containing a gas inlet and gloves. A hygrometer provided in the glove bag indicated that the relative humidity was about 10%. A vessel 2 for dipping a substrate, a silicon substrate (or silicon wafer) 3 and a polytetrafuloroethylene container containing the solution were placed in the glove bag 1, and maintained in a dry state. Then, the surface active material solution was poured into the vessel 2 in an amount sufficient to dip the silicon substrate 3 in it. Then the silicon substrate 3 was dipping and held in the surface active material solution for one hour. A dehydrobromination reaction proceeded between the hydroxyl groups at the silicon substrate surface and the bromotitanium groups, and the substrate surface was uniformly covered by an organic coating film comprising a silane-based surface active material.

Subsequently, a closed container containing chloroform was placed in the glove bag 1 for washing the silicon substrate 3. Chloroform is known to be able to dissolve the surface active material, so it was used as the washing liquid. Chloroform was provided in an amount sufficient to dip the silicon substrate in it. The container containing chloroform had a shape capable of inserting the silicon substrate 3. In the glove bag 1, the closed container containing chloroform was opened to maintain contact with the dry atmosphere.

Then, the silicon substrate 3 was taken out of the vessel 2 containing the surface active material and dipped in chloroform in the closed container. This operation had to be done quickly, even in the glove bag 1 in the dry atmosphere. After the closed container containing the chloroform with the silicon substrate 3 dipped therein was sealed, it was taken out of the glove bag 1.

FIG. 2 shows an apparatus for manufacturing an organic coating film, in which the substrate (here silicon substrate) was washed after formation of the organic coating film on the substrate. A glass container 5 containing chloroform and sealed container 6 containing chloroform with the silicon substrate 3 dipped therein, were placed in a polypropylene glove bag 4 having a shape like that of the glove bag noted above and containing a gas inlet and gloves. The glass container 5 containing chloroform and sealed container 6 containing chloroform with the silicon substrate 1 dipped therein, were maintained in a dry atmosphere by opening the sealed container before taking out the silicon substrate from the chloroform.

Subsequently, the silicon substrate 3 was taken out of the sealed container 6 and put into the glass container 5 containing chloroform for washing away surface active material remaining on the surface of the organic coating film of the surface active material on the silicon substrate without being chemically bonded to the same with chloroform. A square substrate with a side dimension of 5 cm was washed by dipping and holding in 500 ml of chloroform for 15 minutes. After washing, the silicon substrate was taken out of the glass container 5 containing chloroform, then dried in dry nitrogen sealed in the glove bag 4, and then taken out of the glove bag.

With this series of operations, an organic coating film comprising octadecyltribromotitanium was formed on the silicon substrate. It had a thickness corresponding to the molecular length of the surface active material (i.e., 2.5 nm). The surface of this organic coating film contained no hydroxyl groups which could undergo a dehydrobromination reaction with the bromotitanium groups of the surface active material in the solution remaining without being chemically bonded to the substrate. Therefore, only a reaction between the substrate surface and surface active material took place, and no further film was formed on the organic coating film. Thus, the film thickness was not disturbed. The film thickness corresponded to the molecular length of the surface active material used (i.e., at the nanometer level), and thus a super-thin organic coating film was obtained. This thin organic coating film could not detected on a mirror surface which had a silicon substrate.

In addition, when it was formed on a glass or like transparent substrate, the transparency thereof, as measured using a transmission type visible/ultraviolet sphectrograph, did not deteriorate. Further, film formation was carried out in an atmosphere having a relative humidity exceeding 35%. In this case, a white film was formed as in Comparative example 1.

EXAMPLE 4

The same experiment was carried out as in Example 1 except that octadecyltribromosilane was used in lieu of octadecyltrichlorosilane.

The film had a thickness corresponding to the molecular length of the surface active material (i.e., about 2.5 nm). The surface of this organic coating film contained no hydroxyl groups which could undergo a dehydrobromination reaction with the bromosilane groups of the surface active material remaining in the solution without being chemically bonded to the substrate. Thus, only the reaction between the substrate surface and surface active material took place, and no further film was formed on the organic coating film. Thus, the film thickness was not disturbed.

The film thickness corresponded to the molecular length of the surface active material used (i.e., at a nanometer level), and it was possible to form a super-thin organic coating film. Thus the super-thin organic coating film could not be detected on a mirror surface which had a silicon substrate. Further, it could be formed on a glass or like transparent substrate without deteriorating the transparency of the substrate.

In addition, when it was formed on a glass or like transparent substrate, the transparency thereof, as measured using a transmission type visible/ultraviolet sphectrograph, did not deteriorate. Further, film formation was carried out in an atmosphere having a relative humidity exceeding 35%. In this case, a white film was formed as in Comparative example 1.

EXAMPLE 5

The same experiment was carried out as in Example 1 except that octadecyltriiodosilane was used in lieu of octadecyltrichlorosilane.

The film had a thickness corresponding to the molecular length of the surface active material (i.e., about 2.5 nm). The surface of this organic coating film contained no hydroxyl groups, which could undergo a dehydroiodination reaction with the iodosilane groups of the surface active material remaining in the solution without being chemically bonded to the substrate. Thus, only the reaction between the substrate surface and the surface active material took place, and no further film was formed on the organic coating film. Thus, the film thickness was not disturbed.

The film thickness corresponded to the molecular length of the surface active material used (i.e., at a nanometer level), and it was possible to form a super-thin organic coating film. Thus super-thin organic coating film could not be detected on a mirror surface which had silicon substrate. Further, it could be formed on a glass or like transparent substrate without deteriorating the transparency of the substrate.

In addition, when it was formed on a glass or like transparent substrate, the transparency thereof, as measured using a transmission type visible/ultraviolet sphectrograph, did not deteriorate. Further, film formation was carried out in an atmosphere having a relative humidity exceeding 35%. In this case, a white film was formed as in Comparative example 1.

EXAMPLE 6

A glass substrate which was hydrophilic but contained less hydroxyl groups than the substrate of Example 1 was processed. The same effects are obtainable with metal ceramics or plastic. The glass was dipping and held for 30 minutes in a solution prepared by dissolving 1% by weight of a material having a plurality of trichlorosilyl groups, e.g., $SiCl_4$, $SiHCl_3$, $SiH_2Cl_2$, or $Cl(SiCl_2 O)_n Cl_3$ (where n represents an integer in a range from 1 to 20 in a non-aqueous solvent, e.g., a chloroform solvent.), $SiCl_4$ being particularly preferred because it is small in molecular size and active with respect to the hydroxyl groups, thus making the glass surface uniformly hydrophilic. A hygrometer provided in the glove bag indicated that the relative humidity was about 10%. As a result, a dehydrochlorination reaction was brought about on the surface due to some -OH groups present at the glass surface. A chlorosilane monomolecular film of the material having a plurality of trichlorosilyl groups was thus formed.

By using $SiCl_4$, for example, as the material containing a plurality of trichlorosilyl groups, molecules represented by formulas 4 and/or 5.

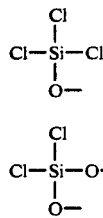

Formula [4]

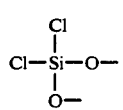

Formula [5]

were secured via —SiO— bonds to the surface through a dehydrochlorination reaction brought about on the surface due to a small amount of hydrophilic —OH groups being exposed at the surface of the glass substrate.

After subsequently washing with a non-aqueous solvent, e.g., chloroform, a hygrometer provided in the glove bag indicated that the relative humidity was about 10%. Unreacted $SiCl_4$ molecules were then removed with water, thus obtaining a siloxane monomolecular film represented by formulas 6 and/or 7.

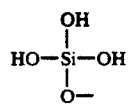

Formula [6]

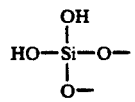

Formula [7]

The monomolecular film (inner layer) obtained in this way was bonded by chemical bonds of —SiO— to the glass substrate and did not separate. In addition, its surface contained numerous —SiOH bonds, corresponding in number to about three times the initial number of hydroxyl groups.

Further, the glass substrate provided with the monomolecular flim having numerous —SiOH bonds at the surface, was dipped and held for about one hour in an aqueous solution containing a material having a fluorocarbon group and a chlorosilane group, e.g., a solution obtained by dissolving about 1 wt. % of

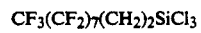

in a solvent containing 80 wt. % of n-hexadecane, 12 wt. % of carbon tetrachloride and 8 wt. % of chloroform. A hygrometer provided in the glove bag indicated that the relative humidity was about 10%, thus producing bonds of

This reaction proceeded substantially the same as above in formulas [1] to [3]. A fluorine-containing monomolecular film thus was formed. The film was chemically bonded to the inner siloxane monomolecular film. It was formed over the entire glass substrate surface and had a thickness of about 2.1 nanometers. It did not separate in a peel-off test.

Washing the substrate using a non-aqueous organic solution was omited. Instead, washing was carried out using water and drying in the air. A fluorine-based polymer film was adsorbed to the substrate. The fluorocarbon-based polymer film had satisfactorily close contact with respect to the substrate, was substantially pin-hole free, thin, anti-contaminating and was transparent.

With an ethylene or acetylene group added to or incorporated in the alkyl chain portion, the monomolecular film is crosslinked after formation by irradiating it with an electron beam of about 5 Mrads, further improving its hardness.

In the above example a carbon fluoride-based monomoecular film having a thickness at the nanometer level, is formed on the glass substrate surface without deteriorating the luster intrinsic to the glass. This film is excellent in tranceparecy, is water- and oil-repelling and makes the glass surface anti-contaminating.

The above examples used octadecyltrichlorosilane, octadecyltrichlorotitanium, octadecyltribromotitanium, octadecyltribromosilane and silane octadecyltriiodide, but the same effects could also be obtained with surface active materials containing a chlorosilane group, those containing a chlorotitanium group, those containing a bromotitanium group, those containing a bromosilane group and those using a silane iodide group. Further, while the above examples concerned the use of a single surface active material, the same effects could also be obtained by using a blend solution containing two or more different surface active materials.

Further, while the above examples used a dipping process, a turn coating process for forming the film can be installed in a room capable of controllings relative humidity at 35% or below.

Further, while the above examples used with an organic coating film as a single layer of a surface active material, it is also possible to form a laminated film by preliminarily forming a single layer of an organic coating film and then chemically or physically treating the film surface to provide the same with hydroxyl or like groups for a dehydrochlorination reaction.

Further, while the above examples used a silicon substrate, it is possible to use any substrate containing exposed hydroxyl groups. Examples of the substrates are metals such as silcon, metal oxides, plastics, fibers, ceramics and coatings. The monomolecular film according to the invention is chemically bonded to the substrate surface, and, therefore, it is does not separate and has excellent durability.

Further, while in the above examples the glove bag is held in a dry atmosphere, it is also possible to provide the dry atmosphere in other methods. Further, while in the above examples the dry atmosphere was produced with dry nitrogen, it is possible to use other gas such as dry air or argon gas.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A method of forming a chemically adsorbed monomolecular film on the surface of a substrate, wherein the surface of the substrate contains active hydrogen groups, comprising:
    (A) preparing a chemical adsorbing material solution by dissolving a chemical adsorbing material in a non-aqueous organic solvent, said chemical adsorbing material having at one end functional molecular groups capable of reacting with the active hydrocarbon on the substrate surface;
    (B) dipping the substrate in said chemical adsorbing material solution in a dry atmosphere of less than about 35% relative humidity, thereby causing adsorption of the chemical adsorbing material to the substrate surface; and
    (C) washing away non-reacted chemical adsorbing material from the substrate surface in a dry atmosphere of no more than about 35% relative humidity, using a non-aqueous organic solution.

2. The method of forming a chemically adsorbed monomolecular film according to claim 1, wherein said molecular groups of said chemical adsorbing material comprise at least one member selected from the group consisting of a halogenated silyl (—SiX) group, a halogenated titanyl (—TiX) group, a halogenated stannyl (—SnX) group, a lower-alkoxysilyl (—SiOR) group, a lower-alkoxytitanyl (—TiOR) group and a lower-alkoxystannyl (—SnOR) group, where X represents chlorine, bromine, fluorine or iodine and R represents a $C_1$-$C_6$ alkyl group.

3. The method of forming a chemically adsorbed monomolecular film according to claim 1, wherein said chemical adsorbing material comprises at one end, a functional chlorosilyl (—SiCl) group and a fluorine group.

4. The method of forming a chemically adsorbed monomolecular film according to claim 1, wherein the concentration of said chemical adsorbing material in said nonaqueous organic solvent is in a range of from $10^{-4}$ to $10^{-1}$ mol/l.

5. The method of forming a chemically adsorbed monomolecular film according to claim 1, wherein the substrate comprises material selected from the group consisting of glass, metals, ceramics, plastics and semiconductors.

6. The method of forming a chemically adsorbed monomolecular film according to claim 1, wherein the substrate is an oxidation treated plastic substrate.

7. A method of forming a chemically adsorbed polymer film on the surface of a substrate, wherein the surface of the substrate contains active hydrogen groups, the method comprising:
    (a) preparing a chemical adsorbing material solution by dissolving a chemical adsorbing material comprising a chlorosilane group in a non-aqueous organic solvent, said chemical adsorbing material having at one end functional molecular groups capable of reacting with the active hydrogen groups on the substrate surface;
    (b) dipping the substrate in said chemical adsorbing material solution in a dry atmosphere of no more than about 35% relative humidity, thereby causing adsorption of the chemical adsorbing material to the substrate surface;
    (c) forming on the substrate an adsorbed precursor film containing a silanol group by reacting the chlorosilane groups with water after the dipping step; and
    (d) drying said adsorbed precursor film.

8. The method of forming a chemically adsorbed polymer film according to claim 7, wherein said molecular groups of said chemical adsorbing material comprise at least one member selected from the group consisting of a halogenated silyl (—SiX) group, a halogenated titanyl (—TiX) group, a halogenated stannyl (—SnX) group, a lower-alkoxysilyl (—SiOR) group, a lower-alkoxytitanyl (—TiOR) group and a lower-alkoxystannyl (—SnOR) group, where X represents chlorine, bromine, fluorine or iodine and R represents a $C_1$-$C_6$ alkyl group.

9. The method of forming a chemically adsorbed polymer film according to claim 7, wherein said chemical adsorbing material comprises at one end, a functional chlorosilyl (—SiCl) group and a fluorine group.

10. The method of forming a chemically adsorbed polymer film according to claim 7, wherein the concentration of said chemical adsorbing material in said non-aqueous organic solvent is in a range of from $10^{-4}$ to $10^{-1}$ mol/l.

11. The method of forming a chemically adsorbed polymer film according to claim 7, wherein the substrate comprises material selected from the group consisting of glass, metals, ceramics, plastics and semiconductors.

12. The method of forming a chemically adsorbed polymer film according to claim 7, wherein the substrate is an oxidation treated plastic substrate.

* * * * *